United States Patent [19]
Hansen et al.

[11] 4,061,007
[45] Dec. 6, 1977

[54] ELECTROMAGNETIC DENT REMOVER WITH ELECTROMAGNETIC LOCALIZED WORK COIL

[75] Inventors: Karl A. Hansen; I. Glen Hendrickson, both of Seattle, Wash.

[73] Assignee: The Boeing Company, Seattle, Wash.

[21] Appl. No.: 646,068

[22] Filed: Jan. 2, 1976

Related U.S. Application Data

[63] Continuation-in-part of Ser. No. 489,290, July 17, 1974, Pat. No. 3,998,081.

[51] Int. Cl.² ............................................. B21D 26/02
[52] U.S. Cl. ..................................... 72/56; 29/421 M; 72/DIG. 30; 336/223
[58] Field of Search .................. 72/54, 56, 57, 705, 72/DIG. 30; 29/421 M; 336/222, 223, 225, 232

[56] References Cited

U.S. PATENT DOCUMENTS

| 963,907 | 7/1910 | Larzelere | 330/223 |
|---|---|---|---|
| 1,994,767 | 3/1935 | Heintz | 336/223 X |
| 3,195,335 | 7/1965 | Brower et al. | 72/56 |
| 3,703,958 | 11/1972 | Kolm | 72/56 X |
| 3,704,506 | 12/1972 | Orr et al. | 72/50 X |
| 3,745,448 | 7/1973 | Hiratsuka | 73/28.5 X |
| 3,771,086 | 11/1973 | Poulsen | 336/223 X |
| 3,810,373 | 5/1974 | Quegrolx | 72/56 |

Primary Examiner—Leon Gilden
Attorney, Agent, or Firm—Christensen, O'Connor, Garrison & Havelka

[57] ABSTRACT

An electromagnetic dent remover including a dent removal head containing an electromagnetic work coil capable of creating a locally concentrated magnetic field when first energized by a slow rising current followed by a fast pulsing counter current is disclosed. The electromagnetic work coil comprises a cylinder formed of a spirally wound metal strip whose convolutions are electrically insulated from one another by coatings or layers of electrical insulation. In one form, slots and holes, located in the walls of the coil, control the electrical current density within the coil to thereby produce the desired locally concentrated magnetic field. In another form, the ends of the coil are machined such that at least one magnetic field concentration projection projects outwardly from one annular end of the coil. The other end of the coil is machined such that it is a mirror image of the projection end. In either form the electromagnetic work coil is encased in a nonmagnetic housing, which may be formed by encapsulation.

35 Claims, 10 Drawing Figures

ELECTROMAGNETIC DENT REMOVER WITH ELECTROMAGNETIC LOCALIZED WORK COIL

RELATIONSHIP TO OTHER APPLICATIONS

This application is a continuation-in-part of application Ser. No. 489,290 filed July 17, 1974 by the inventors named herein and entitled ELECTROMAGNETIC DENT PULLER, such patent application now having issued as U.S. Pat. NoI 3,998,081. The benefit of the filing date of this application is claimed under 35 USC 120.

Background of the Invention

This invention relates to devices for removing dents and more particularly to devices for removing dents from electrically conductive materials using electromagnetic energy.

In the past, devices adapted to remove dents from conductive materials using electromagnetic energy have been proposed and used. One such device is described in U.S. patent application Ser. No. 489,290 referenced above. With respect to application Ser. No. 489,290, the information contained therein, particularly the information describing the production and application of electrical current to the electromagnetic working coil of an dent removal head, is incorporated herein by reference.

While electromagnetic dent removers of the type described in U.S. patent application Ser. No. 489,290 have proven to be somewhat satisfactory, they are not as satisfactory as desirable. One area remaining subject to improvement is the electromagnetic work coil forming part of the dent removal head. More specifically, as it will be recognized by those skilled in the art and others, the configuration of the electromagnetic working coil is important to the successful operation of an electromagnetic dent remover. Generally the configuration of such coils has heretofore been subject to conflicting design constraints leaving the designer no choice but to compromise various design objectives. From a magnetic parameter standpoint, the design objective is to effectively achieve a localized area of flux concentration (stressing region) by employing a high magnetic field to current ratio. From a geometrical standpoint, the design objective is to have a size and shape the conforms to the geometry of small dents so that the forces do not act on the metal surface beyond the boundaries of the dent, while providing a coil large enough to ensure that the magnetic field does not decrease too rapidly with respect to the thickness of the dented metal. From a mechanical standpoint, the dent removal coil must be rugged enough to withstand the deformation and deflection forces created by the second current pulse. Further, the coil must be economically producable. Also, thermal characteristics must also be considered, since a considerable amount of thermal energy is produced, especially during the slower rising first current pulse. Finally, the coil's electrical characteristics must be compatible with the current source circuitry. Further, since a large variety of dent configurations may be encountered, it is advantageous to construct the dent remover such that dent removal heads having variously configured electromagnetic working coils can be utilized.

In application Ser. No. 489,290 several working coils are disclosed, along with a method of manufacturing them. Generally each coil is formed by spirally winding a conductive wire rod or ribbon coated with a non-conductive material. In each of the configurations, the magnetic flux is concentrated in a stressing region by forming the coil such that only a desired portion thereof is in close proximity to the dent when the dent removal head is suitably positioned. The coil is formed to a desired shape by electromagnetically deforming a flat spiral wound coil placed within a mold structure. Since the strength of the electromagnetic field coupled to the dented material varies as a function of the distance between the windings of the coil and the work surface, the nature of the coil deformation controls the flux concentration area. Hence, appropriately deforming the coil will result in the production of a flux pattern suitable for use with dents falling within a predetermined size range.

Although coils formed in accordance with the teachings of application Ser. No. 489,290, referenced above, perform satisfactorily and are amenable to economic fabrication, they are not as satisfactory as desirable in certain other aspects. The present invention is directed to overcoming these disadvantages.

Accordingly, it is an object of this invention to provide dent removal heads having new and improved electromagnetic work coils.

It is a further object of this invention to provide new and improved electromagnetic work coils that are inexpensive to manufacture yet are readily formed so as to be useful in removing dents from objects having a wide variety of sizes and shapes.

It is another object of this invention to provide economically producable electromagnetic work coils having improved mechanical strength, good thermal characteristics and relatively small size, yet capable of producing an adequately strong locally concentrated electromagnetic field.

It is yet another object of this invention to provide electromagnetic dent removal apparatus including new and improved electromagnetic work coils suitable for use in removing dents from a wide variety of conductive materials shaped and sized in various manners.

SUMMARY OF THE INVENTION

The foregoing other objects of this invention are achieved by providing dent removal head including electromagnetic work coils having stressing regions at which various force patterns, adapted to facilitate the removal of different dent configurations, are established. The electromagnetic work coils of this invention include a flat conductor and a layer of insulation spirally wound to form a cylindrical electrical coil. In some preferred embodiments, the stressing region is established on one annular face (one end) of the cylindrical coil either by a slot or hole formed in the wall of the coil and extending from the opposing annular face toward the stressing region annular face. The hole or slot reduces the cross-sectional area of the coil at the stressing region and, thereby, increases the electrical current density at the stressing region. The increased current density at the stressing region produces a locally concentrated magnetic field, i.e. the magnetic field in this region is much stronger than is the magnetic field in the surrounding regions, in which the current density is lower. The stressing region establishing hole or slot is complemented by a secondary slot extending through the wall of the coil from the stressing region annular face toward the opposing annular face. Preferably, this secondary slot is diametrically opposed to the stressing region establishing hole or slot. The secondary slot directs current flow away from regions of the stressing region annular face lying outside of the stressing region. In this manner a high current density, and a locally high magnetic field are produced at the stressing region. A usable dent removal head is formed by encapsulating the coil structure in a non-magnetic housing.

In some other preferred embodiments of this invention, the stressing region is formed by a portion of the coil protruding from one annular face. The other annular face of the coil is recessed or undercut in the protruding region to control the cross-sectional area of the coil and, thus, current density. In these embodiments, the electromagnetic force or stress is effected by the difference in the spatial separation between different coil regions and the surface of the dented conductive material when the dented conductive material is located at a plane orthogonal to the longitudinal axis of the coil. This interface plane is positioned at or just beyond the tip of the protrusion by encapsulating the working coil in a housing formed such that an end of the housing defines this interface plane. Flux is more highly concentrated in the interface plane at the region of the protrusion, than in other coil regions, due to the close proximity between the protrusion and the dented material. The stress-producing electromagnetic field in the protrusion region is further increased in some of these embodiments of the invention by contouring the coil in the protrusion region so as to decrease the cross-sectional area of the coil in this region relative to the cross-sectional area of the coil outside of this region.

Further, in accordance with this invention, coils of the foregoing nature are connected to an electrical circuit that generates a relatively slowly rising current pulse followed by an opposing polarity current pulse of relatively fast rise-time. The slowly rising current pulse causes a repelling force to occur between the dent removal coil and the dented conductive material. The fast rise-time current pulse rapidly collapses the electromagnetic field established by the slow rise-time current pulse. The amplitude of the fast rise-time current pulse ranges from approximately 50% to approximately 100% of the amplitude of the slow rise-time current pulse, depending on the type of conductive material being worked.

Preferably, a non-conductive mold or mask is placed between the surface of the dented part and the stress-producing annular coil face. The mask has an opening configured to approximate the area of at least a portion of the dent, and a thickness dimensioned to permit the dented region of the part to be pulled slightly beyond the finished surface so that when spring-back occurs, after energy removal, the dented region will be flush with the surrounding surface of the part.

As shall be discussed more fully in the following paragraphs, the coil configurations of the present invention satisfy each of the above-described design constraints. In addition, utilization of the working coils on the present invention in the dent removal head of a dent removal system minimizes the amplitude of the repelling force occurring between the coil and the dented material during the first current pulse period. Minimizing this repelling force enhances system operation in embodiments in which the dent removal head is portable, rather than being supported by a structure such as an arm and a boom of the type illustrated and described in the previously referenced patent application.

BRIEF DESCRIPTION OF THE DRAWING

Other objects and advantages of the present invention will become apparent to one skilled in the art after a reading of the following description taken together with the accompanying drawing, in which:

FIG. 4b is a cross-sectional view along line 4b—4b of FIG. 4a;

FIG. 5b is a cross-sectional view along line 5b—5b of FIG. 5a;

DESCRIPTION OF THE PREFERRED EMBODIMENTS

Figure 1:
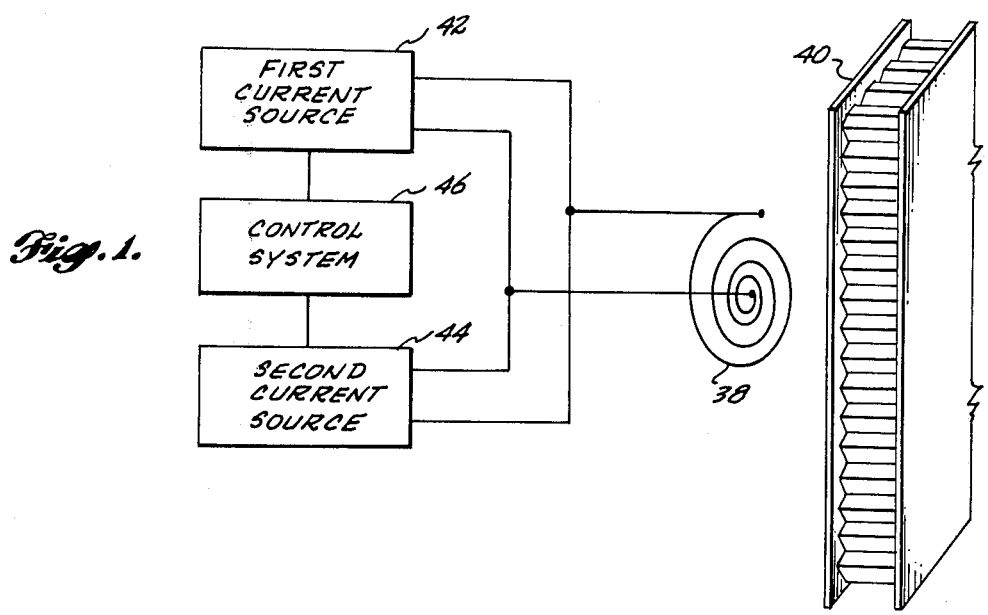
FIG. 1 is a partially block, partially pictorial, generalized diagram used to illustrate the operation of an electromagnetic dent remover including a dent removal head containing an electromagnetic working coil formed in accordance with the invention.

FIG. 1 illustrates an electromagnetic working coil 38 located adjacent to a part 40, illustrated as a honeycomb core panel. The working coil 38 is connected to first and second current sources 42 and 44 controlled by a control system 46. As more fully described in U.S. patent application Ser. No. 489,290, referenced above, the first and second current sources establish a time varying electromagnetic field adapted to remove dents from the part 40. The current pulses are applied to the dent removal coil under the control of the control system 46. The current sources may, for example, be formed by chargeable capacitor banks. In any event, the electrical components of the system are selected such that the first current source 42 produces a relatively slowly rising current through the electromagnetic working coil 38, whereby a strong electromagnetic field is produced by the coil 38. It is pointed out here that while rapid (0.08–1.6 milliseconds), the rise-time of the first current pulse must be such that the resulting electromagnetic field is not strong enough to deform the part 40.

When the first current pulse reaches a predetermined value, the control system 46 applies an opposite polarity current from the second current source 44 to the dent removal coil 38. The rise-time of this second current pulse is much shorter than the rise-time of the first current pulse. In this regard, rise-times on the order of 10 to 40 microseconds have been successfully utilized, with a 20 to 30 microsecond rise-time generally producing the most satisfactory results. In any case, the countercurrent produced by the second current pulse, rapidly collapses the electromagnetic field, produced by the first current pulse, to exert a strong impulsive force on the dent. As best understood, it is believed that this impulsive force effectively "pulses" the dent out of the part.

Figure 2:
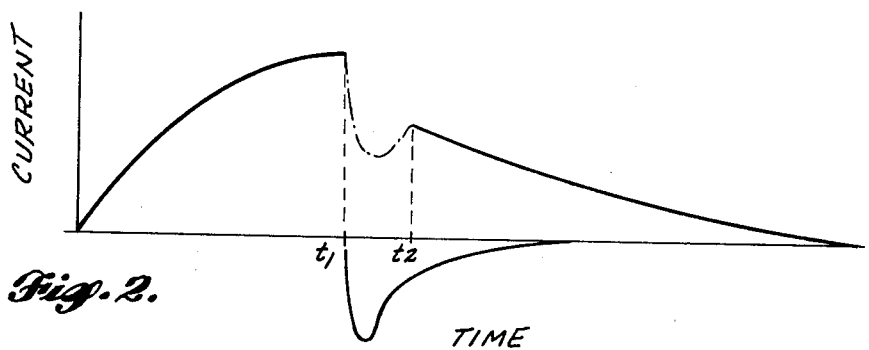
FIG. 2 is a graph illustrating the resulting current flow through a electromagnetic working coil formed in accordance with this invention for one set of first and second current pulses.
Figure 3:
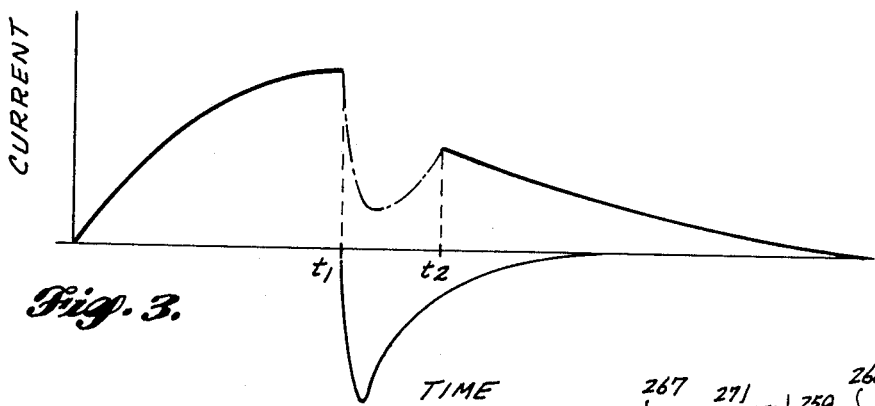
FIG. 3 is a graph illustrating the resulting current flow through an electromagnetic working coil formed in accordance with this invention for a second set of first and second current pulses.

FIGS. 2 and 3 depict the time varying current flowing through the electromagnetic working coil 38 caused by the super-position of the above-described first and second current pulses for different second pulse configurations. In each figure, the current flow prior to time $t_1$ is established solely by the the first current pulse. At time $t_1$, the second current pulse (shown below the zero current axis in FIGS. 2 and 3) rapidly decreases the coil current, After time $t_2$ (generally the end of the second current pulse), the current through the coil 38 decreases in a generally exponential manner.

Examining FIGS. 2 and 3, it will be noted that these figures differ in the rise-time and amplitude of the second current pulse, to thereby establish a corresponding difference in the current flowing through electromagnetic working coil 38. In the practice of this invention, it has been determined that although a variety of rise-time characteristics are satisfactory, the amplitude of the second current pulse is advantageously established between 50 and 100% of the amplitude of the first current pulse, depending on the type of metal from which the dent is being removed. For example, when straightening aluminum and magnetic steels, the second current pulse should have a magnitude on the order of 50% of the first current pulse. When working with nonmagnetic stainless steel, a ratio on the order of 80-90% is generally advantageous and when straightening titanium a ratio of 90-100% has been successfully employed. In any case, the proper ratio for a particular metal can be determined by a simple test conducted on a sample of the particular metal of interest.

In the practice of this invention a dent may be removed by the single operating cycle described above or a series of operating cycles may be employed to effect a gradual straightening of the dent. Additionally, in the removal of dents having a generally elongated shape, the coil 38 may be progressively moved along the length of the dent between operational cycles.

Figure 4B:
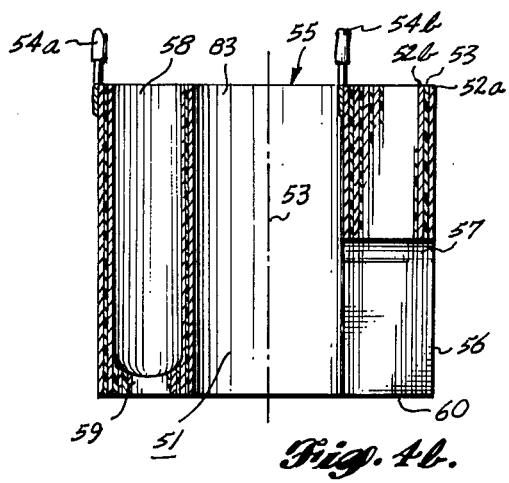
Figure 4A:
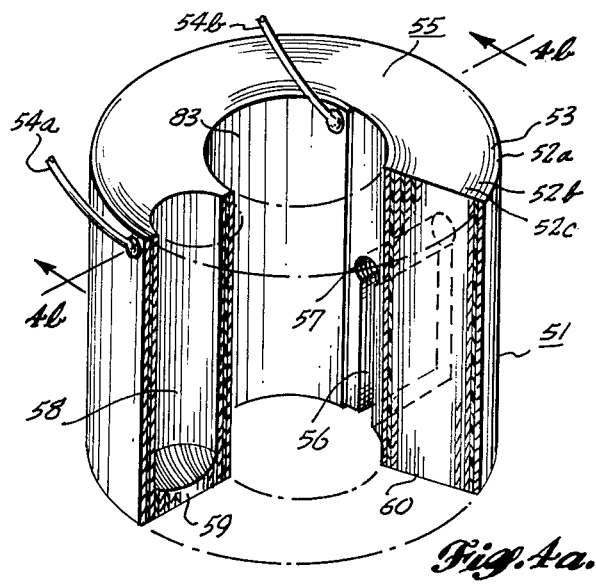
FIG. 4a is a perspective view of one embodiment of an electromagnetic working coil formed in accordance with this invention.

FIGS. 4a and 4b depict one embodiment of an electromagnetic working coil 51 formed in accordance with this invention. The coil is formed by spirally winding, on edge, a flat, electrically conductive strap or strip to produce a cylindrical coil having a plurality of convoluted turns or layers (three of which are identified as 52a, 52b and 52c in FIGS. 4a and 4b). A layer or layers of an electrically insulating material 53 is interposed between the convoluted layers, and electrical conductors 54a and 54b are respectively electrically connected to the inside and outside terminating ends of the coil. Although a variety of conductors and insulators are suitable, a coil formed of 10 to 20 convolutions of a copper strip having a thickness on the order of 0.030 inches with the convolutions separated by fiberglass or Kapton insulation having a thickness on the order of 0.003 inches has been used successfully. While the length of the coil 51 can vary, 1 to 2 inches has been found adequate to provide a coil compatible with small dent configurations without loss of adequate thermal properties. Generally, the diameter of the central longitudinal aperture 83 in such a coil 51 should be on the order of one inch, whereby the 10 to 20 convolutions will result in an outside diameter of approximately 2 inches.

A stressing region 59 is formed on one annular face 60 and 4b as the lower annular face. The stressing region is preferably formed by first cutting a hole 58 in the wall of the coil at the stressing region 59. The hole 58 has an axis lying parallel to the longitudinal axis of the coil 51 and extends from the annular face 55 of the coil 51 opposed to the stressing region annular face 60, through a major portion of the length of the coil. The hole 58 terminates just short of the stressing region annular face. In addition to the hole 58, a slot aperture 56 is cut through each convoluted turn in one region of the cylindrical wall of the coil 51 to form a passageway between the central aperture 83 and the outer surface of the coil. The slot aperture 56, perferably, is diametrically opposed to the hole 58 and extends inwardly from the stressing region annular face 60 along the length of coil 51 for a distance equal to approximately one-half of the longitudinal length of the coil. Preferably, the slot aperture 56 terminates at a transverse circular hole 57 extending between the central aperture 83 and the outer surface of coil 51. The circular hole 57 may have a diameter larger than the width of the slot. In any event, the diameter of the circular hole should be adequate to prevent the occurrence of the magnetic breakdown that could occur if the slot aperture 56 terminated abruptly.

Slot aperture 56 and hole 58 respectively reduce the cross-sectional wall area of the dent removal coil 51, such that, when an electrical potential is applied across the coil the coil current density in the region of the slot aperture and the hole is greater than the current density in the other regions of the coil. More specifically since slot aperture 56 and hole 58 reduce the cross-sectional area of the coil convolutions, coil current density in the non-removed portion of cylindrical coil 51 in these regions are increased. The increased current density increases the resulting electromagnetic field in these areas. Thus, a localized magnetic field is created at the stressing region 59 of the stressing region annular face 60. Accordingly, when the stressing region annular face 60 is positioned in close proximity to a part 40 (FIG. 1), i.e., a part is positioned in a plane parallel to and near the stressing region annular face, and an electrical current is passed through the coil 51, a strong electromagnetic force is applied to the part at the location of the stressing region.

Virtually any size and shape electromagnetic force field can be established by merely varying the cross-sectional size and shape of the hole 58. In this regard, hole 58 may have a circular cross section, as illustrated, or it may take on any other cross-sectional shape, as desired, depending upon the desired shape of the flux field. Further, the profile or contour established at the bottom of the hole 58 can be controlled to vary the current density and resulting electromagnetic field within the basic pattern established by the cross-sectional geometry of the hole. For example, if the hole 58 is of uniform depth, the current density will be relatively constant within each turn of the convoluted conductor that is interrupted by the hole. Thus, the flux intensity within the stressing region 59 will be substantially uniform. On the other hand, if the profile of the hole bottom is contoured to selectively control the crosssectional area of the convolutions such that different convoluted turns have different cross-sectional areas, the current density within the stressing region will vary. As shown in FIGS. 4a and 4b, one convenient profile is formed by rounding or pointing the bottom of the hole 58 to concentrate electromagnetic flux in the central portion of the stressing region. Regardless of the profile utilized, it will be recognized that controlling the depth and bottom contour of the hole 58 controls the crosssectional area of each convolution in the stressing region 59. Controlling the cross-sectional area of the convolutions, in turn, controls the current density and the resulting electromagnetic flux pattern at the stressing region.

In a similar fashion, the coil current density in the region of slot aperture 56 is concentrated at the other annular face 55. This increases in the current density at this annular face 55 reduces the current density in those regions of the stressing region annular face located outside of the stressing region 59. Thus it can be realized that slot aperture 56 and hole 58 cooperate to establish a desired localized magnetic flux pattern at the stressing region 59.

Figure 5B:
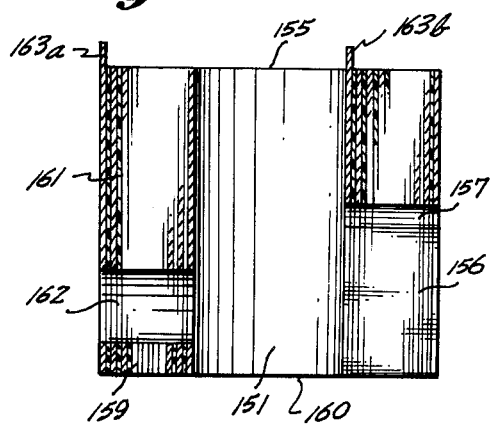
Figure 5A:
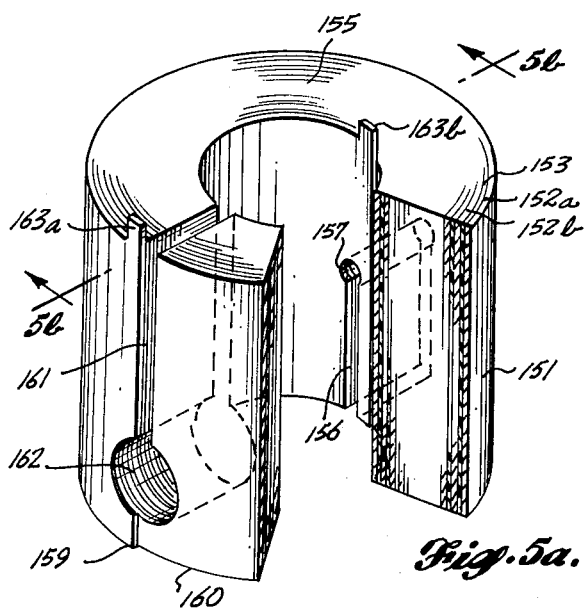
FIG. 5a is a perspective view of a second embodiment of an electromagnetic working coil formed in accordance with this invention.

FIGS. 5a and 5b depict a second embodiment of an electromagnetic working coil 151 formed in accordance with this invention. The coil 151 of FIGS. 5a and 5b is similar to the coil of FIGS. 4a and 4b in that it is formed of a convoluted conductive strip, with each convolution 152a, 152b, etc., separated from its adjacent convolutions by an insulating layer 153.

A stressing region 159 is formed on one annular face 160 (illustrated as the lower face) of the embodiment depicted in FIGS. 5a and 5b. The stressing region in formed by a slotted aperture 161 extending through the wall of the coil from the other annular face 155, through a major portion of the longitudinal length of the coil. As shown, the slotted aperture 161, preferably, is terminated by a transverse hole 162 extending through the wall of the coil. Also, perferably, the axis of the terminating hole 162 is located coincident with the center line of the slotted aperture 161. Slotted aperture 161 and terminating hole 162 increase the current density in the non-severed portions of the coil. As previously discussed, the increase current density established at stressing region annular face 160 concentrates the electromagnetic flux over a specific portion of the coil face. The geometrical cross section of the terminating hole 162 determines the geometry of the resultant flux pattern established at the stressing region annular face 160. Thus, like the bottom of the hole 58 in the embodiment of FIGS. 4a and 4b, the wall contour of the terminating hole can be varied to establish a desired flux pattern. In addition to the slotted aperture 161, the FIG. 5a and 5b embodiment includes a diametrically opposed slot aperture 156 and terminating hole 157 similar to the slot aperture 56 and terminating hole 57 illustrated in FIGS. 4a and 4b and described above. Again, the slot aperture 156 enhances the concentration of electromagnetic flux at the stressing region 159 by decreasing flux in the non-stressing regions of the stressing region annular face 159.

FIGS. 5a and 5b also depict electrical terminations 163a and 163b, formed as an integral part of each end of the convoluted conductor. Electrical termination 163a and 163b can be shaped to form male type terminals adapted to mate with quick disconnect female terminals, or they can be utilized as solder terminals for connection to suitable electrical conductors.

Figure 7:
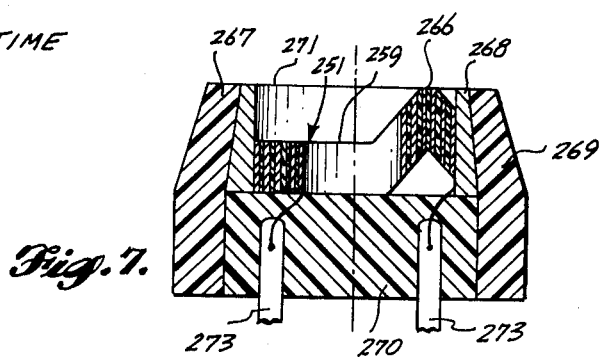
FIG. 7 is a cross-sectional view of the electromagnetic working coil of FIG. 6 encapsulated in a suitable nonconductive housing; and, FIG. 8 is a fragmented, cross-sectional side elevation section view of a dent removal head including an electromagnetic working coil of the type illustrated in FIGS. 4a and 4b positioned against a dented part.
Figure 6:
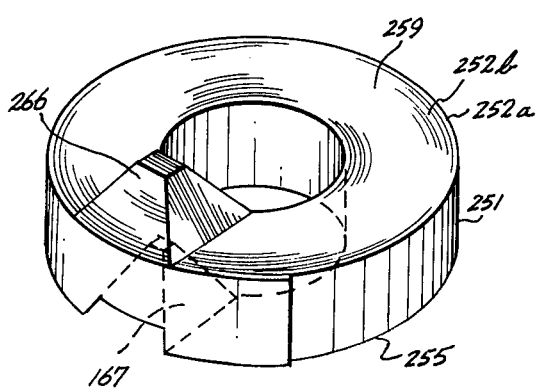
FIG. 6 is a perspective view of a third embodiment of an electromagnetic working coil formed in accordance with this invention.

FIGS. 6 and 7 depict, respectively, another electromagnetic working coil 251 formed in accordance with this invention and that coil structure mounted in a dent removal head encapsulating housing (FIG. 7 only). The electromagnetic working coil 251 is formed of a plurality of convolutions of a strip of conductive material, with adjacent convolutions separated by insulating material. Reduced electromagnetic flux intensity is established over the area of a working face of a dent removal head lying outside a stressing region by completely machining away one end of the coil over a major portion of its circumference. The remaining portion, illustrated as a truncated pyramidal protrusion 266 forms the electromagnetic stressing region of the resultant dent removal head. The pyramidal protrusion 266 depicted in FIGS. 6 and 7 is merely one exmaple of protrusion geometry that can be employed. Regardless of the shape of the protrusion, an aligned recess is machined in the opposing annular face 255 of the coil. The aligned recess 267 is, preferably, a mirror image or complement of the protrusion 266. The complementary configuration of the protrusion and the recess results in each adjacent convolution 252a, 252b, etc. having a cross-sectional area through the defined stressing area that is equal to or less than the cross-sectional area of the same convolution through the remainder of its length.

As illustrated in FIG. 7, the electromagnetic coil 251 is encapulated by a suitable encapsulating case 267, which may be formed of a plurality of elements 268, 269 and 270 adapted to maintain the truncated end of the pyramidal protrusion in a plane parallel to, but spaced from, the planar face created when portions of the stressing region annular face 259 of the coil were machined away. Thus, at this "working plane" 271, the magnetic flux density in the stressing region (i.e., truncated end of the pyramidal protrusion) is substantially greater than the magnetic flux density in the remaining portions of that plane 271. The case 267 is also illustrated as supporting a pair of quick disconnect terminals 273 electrically connected to the ends of the dent removal coil 251.

It will be recognized from the foregoing description that, in any particular realization of the embodiment of the invention illustrated in FIG. 6 in which each convolution is of substantially identical cross-sectional area, the increased electromagnetic field intensity produced by the current flowing within the stressing region results solely from the spatial relationship between the dent removal coil 251 and the dented work piece. That is, if the cross-sectional area of each coil convolution is identical throughout its length, the electromagnetic flux intensity at the surface of the dented conductor depends only on the distance between the dented surface and stressing region annular face 259 at each point. However, recess 267 and protrusion 266 may be configured to reduce the cross-sectional area of the convoluted conductor at the stressing region relative to the cross-sectional area of the convoluted conductor outside of the stressing region. If so, a correspondingly higher electromagnetic flux will exist at the stressing region. Accordingly, it is to be understood that protrusion 266 and recess 267 can be configured in a number of ways to establish a variety of electromagnetic flux patterns at the stressing region, as desired. In this regard, attention, is directed to the discussion of the embodiments of the invention illustrated in FIGS. 4a, 4b, 5a and 5b.

In addition to varying the geometric configuration of the protrusion, as discussed above, to provide control of the electromagnetic flux pattern, the wall contour of the recess 267 can be varied from a mirror image of the protrusion 266 to further control the electromagnetic flux pattern at the stressing region. As in the case of contouring the bottom of hole 58 in the embodiment of the invention illustrated in FIGS. 4a and 4b, such contour control selectively controls the cross-sectional area of the convolutions within recess 267 to vary the current density and, therefor, the electromagnetic field pattern and intensity at the stressing region.

Although machining away portions of a convoluted cylindrical coil has been described above as one method of forming protrusion 266 and recess 267, it will be recognized that the protrusion and recess can also be realized by appropriately shaping a flat metal strip before it is wound to form a dent removal coil.

It will be observed, by examining the embodiments of the dent removal coil illustrated in FIGS. 4–7, that each embodiment is not only capable of establishing variously configured electromagnetic flux patterns, but also that each configuration achieves the previously enumerated design objectives. Specifically each embodiment is mechanically rugged, particularly if the coil is constructed with insulative layers that can be cured after the coil is wound, to effectively provide an integral structure. Since a relatively large volume of conductive material is contained within each coil embodiment, good thermal characteristics are achieved. Thus, rapid recycling of the dent removal cycle and operation at high current levels are permitted. The relatively high magnetic field to current ratio exhibited by these coils results in superior magnetic characteristics. Further in the embodiment illustrated in FIG. 7, the area of the convolutions adjacent to the slotted aperture 161 provide magnetic shielding to effectively concentrate the electromagnetic field within the stressing region 159 during the second current pulse. In addition, the electrical resistance of all of the embodiments is advantageously low due to the relatively large cross-sectional area of the convolutions. Finally, suitable inductance values may be achieved with relatively few convolutions.

Figure 8:
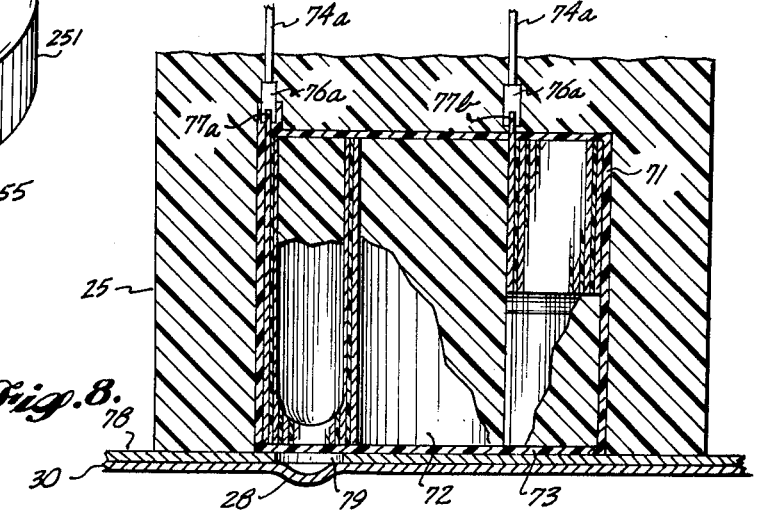

FIG. 8 depicts an electromagnetic working coil formed in accordance with this invention, (illustrated as the dent removal coil 51 illustrated in FIGS. 4a and 4b enclosed in a suitable housing. The composite structure forms a dent removal head suitable for use in a dent remover of the type illustrated in FIG. 1. The illustrated housing comprises a quickly replaceable cylindrical insert 71 and a non-conductive encapsulating material 72 that fills the central cavity of the coil 51, as well as the slot and hole which control the nature of the electromagnetic field in the stressing region. The slots and holes may be filled prior to encasing the coil 51, or they may be filled in a single molding operation when insert 71 is formed, i.e. the insert 71 may be formed as part of the encapsulating material. A thin non-conductive protective layer lying over the working face of the coil 51 is preferably included to prevent the damage that could occur if adjacent coil windings became electrically connected to one another via the dented part, for example. The protective layer 73 may be a separate thin non-conductive sheet material bonded to the working surface of the coil and insert 71. Alternatively it can be formed as an integral part of insert 71 when the coil 51 is encapsulated. Electrical connection to the dent removal coil is provided via wires 74a and 74b, each of which are terminated by quick disconnect female connectors 76a and 76b. The female electrical connector 76a and 76b mate with the male electrical connectors 77a and 77b, which may be formed as an integral portion of the dent removal coil, as discussed above. This manner of connection allows the dent removal head to be readily inserted into a surrounding support structure 25.

As further depicted in FIG. 8, when the dent removal head of this invention is utilized to remove a dent 28 from a conductive sheet 30, the stressing region of the electromagnetic working coil is placed, directly over the dented region. A nonconductive mask 78 is, preferably, place between the coil and dented conductive material 30. The mask includes an aperture 79, located at the stressing region. Thus, the mask aperture 79 is place directly over the dent 28. As explained in detail in our previously referenced copending application, the mask aperture 79 is configured to approximate the area of the dent 28 and the mask 78 is generally 0.003 to 0.006 inches thick. The mask aperture 79 permits the dented portion of the conductive surface to be pulled into the opening during the dent removal cycle to compensate for metal springback.

As will be understood from the foregoing description, the electromagnetic working coils of the invention may be formed from a conductive sheet of material and a sheet of electrically insulating material of substantially the same geometry. Alternatively a coating of thermosetting resin on the conductive sheet can be used in place of an insulating sheet of material. In either case the conductive sheet and the insulation are spirally wound in a edgewise manner to form a cylindrical coil. Preferably, the insulating material is of a variety which can be either air or oven cured so that when the coil is thusly cured, an integral structure is formed. Next this integral coil blank is machined to produce the desired electromagnetic working coil configuration. Since machining will often produce burrs or splayed conductive edges that can result in electrical short circuiting of adjacent convolutions, it is necessary that the machining be carefully performed or, preferably, that the coil be chemically etched after the machining operation with an etchant that does not react with the insulation. Following such a deburring operation, electrical connections are provided if they have not been previously formed as an integral portion of the conductor windings. The dent removal coil is then placed in a mold or form and encapsulated within a non-conductive material. Finally, if not provided during the encapsulation of the dent removal coil, the thin protective layer is placed over the coil working surface. This protective layer may be either a thin sheet bonded to the working surface, or an air or heat curing resonous coating.

While preferred embodiments of the invention have been illustrated and described it will be appreciated that various changes can be made without departing from the spirit and scope of the invention. Hence, the invention can be practiced otherwise than as specifically described herein.

What is claimed is:

1. Apparatus for electromagnetically removing dents from conductive materials comprising:
   a first current source for supplying a first current pulse of predetermined polarity and rise time;
   a second current source for supplying a second current pulse having a polarity opposite to that of said first current pulse, said second current source including means for establishing the magnitude of said second current pulse at a predetermined magnitude relative to the magnitude of said first current pulse and means for establishing a rise time of shorter duration than said rise time of said first current pulse;

a dent removal head including an electrical coil formed of a conductive strip and electrically insulating material, said conductive strip having a width to thickness ratio substantially greater than unity and spirally wound to form a cylindrical coil having a plurality of convolutions with said insulating material interposed between adjacent convolutions, said dent removal head having a working surface positionable over said dents of said conductive material, said cylindrical coil being configured and arranged to define a predetermined stressing region within said working surface of said dent removal head, said predetermined stressing region supplying localized electromagnetic flux when electrical current flows through said convolutions, said localized electromagnetic flux being higher in intensity than the electromagnetic flux formed within regions of said working surface outside of said stressing region; and control means connecting said coil to said first and second current sources for supplying said first and second current pulses to said electrical coil, said control means including means for supplying said second current pulse at a time when said first current pulse attains a predetermined magnitude.

2. The dent removal apparatus of claim 1, wherein said means for establishing the magnitude of said second current pulse includes means for establishing said predetermined magnitude of said second current pulse at approximately 50% of the magnitude of said first current pulse.

3. The dent removal apparatus of claim 1, wherein said means for establishing the magnitude of said second current pulse includes means for establishing said predetermined magnitude of said second current pulse at approximately 80% of the magnitude of said first current pulse.

4. The dent removal apparatus of claim 1, wherein said means for establishing the magnitude of said second current pulse includes means for establishing said predetermined magnitude of said second current pulse at approximately 90% of the magnitude of said first current pulse.

5. The dent removal apparatus of claim 1, including a first aperture for defining said stressing region, said first aperture cutting at least a portion of said plurality of convolutions, said first aperture extending inwardly from the annular face of said coil opposed to the stressing region annular face through the wall of said coil for a predetermined distance and lying along a line substantially parallel to the axial center line of said coil.

6. The dent removal apparatus of claim 5 including a second aperture for decreasing the electromagnetic flux intensity in regions of said working surface outside of said predetermined stressing region, said second aperture cutting at least a portion of said plurality of convolutions, said second aperture extending through the wall of said coil inwardly from the annular face including said stressing region for a predetermined distance and lying along a line substantially parallel to the axial center line of said cylindrical coil.

7. The dent removal apparatus of claim 1, wherein said spirally wound cylindrical coil includes a protrusion on one annular face thereof for defining said stressing region, said spirally wound cylindrical coil further including a recessed region of predetermined geometry formed in the other annular face thereof, said protrusion and said recess positioned so as to control the cross-sectional area of coil convolutions within said stressing region of said cylindrical coil.

8. An electromagnetic working coil for supplying a predetermined region of concentrated electromagnetic flux comprising:

a strip of conductive material spirally wound lengthwise into the shape of a coil having two annular end faces, one of said faces forming a stressing region annular face;

an electrically insulating material interposed between adjacent convolutions of said coil to electrically insulate adjacent convolutions from one another; and, a first aperture extending inwardly from the face of said coil other than said stressing region annular face, toward said stressing region annular face such that a magnetic stressing region is formed in said stressing region annular face in alignment with said first aperture.

9. The electromagnetic working coil of claim 8 including a second aperture extending inwardly through the wall of said coil from said stressing region annular face toward said other face of said coil.

10. The electromagnetic working coil of claim 9, wherein said first and second apertures are substantially diametrically opposed about the longitudinal centerline of said coil.

11. The electromagnetic working coil of claim 10, wherein at least one of said first and second apertures are terminated by a transverse circular opening extending through each of said adjacent conductive convoluted layers.

12. The electromagnetic working coil of claim 11, wherein said first aperture is a hole and said second aperture is a slot.

13. The electromagnetic working coil of claim 12 wherein the terminating portion of said hole is contoured to establish variations in the cross-sectional area of said adjacent convolutions.

14. The electromagnetic working coil of claim 11, wherein said first and second apertures are slots.

15. The electromagnetic working coil of claim 14 wherein the terminating portion of said first aperture is contoured to establish variations in the cross-sectional area of said adjacent convolutions.

16. The electromagnetic working coil of claim 9, wherein said first aperture is a hole and said second aperture is a slot.

17. The electromagnetic working coil of claim 9, wherein said first and second apertures are slots.

18. An electromagnetic working coil for supplying a predetermined region of concentrated electromagnetic flux comprising:

a strip of conductive material spirally wound lengthwise into a tubular coil, said conductive material strip shaped to form a first annular surface having a protrusion over a predetermined portion thereof, said conductive material strip further shaped to form a second annular surface having a recess in a predetermined region thereof, said recess positioned so as to control the cross-sectional area of the conductive material strip forming said protrusion of said first annular surface; and electrical insulation material interposed between adjacent convolutions of said electrical coil.

19. The electromagnetic working coil of claim 18, wherein said recess is a mirror image of said protrusion.

20. The electromagnetic working coil of claim 19, wherein said recess is shaped such that the cross-sectional area of the portion of said conductive material strip forming said protrusion is less than the cross-sectional area of the remaining portions of said conductive material strip.

21. The electromagnetic working coil of claim 20, wherein said recess is contoured to establish variations in the cross-sectional area of said coil in the region of said protrusion, said cross-sectional variations controlling the current density within the portion of each of said convolutions forming said protrusion.

22. A dent removal head for an electromagnetic dent remover comprising:
an electromagnetic coil comprising a strip of conductive material spirally wound lengthwise into the shape of a coil having two annular end faces, one of said faces forming a stressing region annular face; an electrically insulating material interposed between adjacent convolutions of said coil to electrically insulate adjacent convolutions from one another; and, a first aperture extending inwardly through the wall of said coil from the annular face of said coil other than said stressing region annular face toward said stressing region annular face such that a magnetic stressing region is formed in said stressing region annular face in alignment with said first aperture, said first aperture reducing the cross-sectional area of those ones of said adjacent convolutions in alignment with said stressing region and said first aperture to increase the current density in regions of said adjacent convolutions that are in alignment with said stressing region when an electrical current flows through said cylindrical coil; and,
a non-conductive housing for supporting and maintaining said electromagnetic working coil in a predetermined position with respect to a working plane defined by said housing.

23. The dent removal head of claim 22 including a second aperture extending inwardly through the wall of said coil from said stressing region annular face toward said other face of said coil, said second aperture being positioned outside of said magnetic stressing region to decrease electromagnetic field intensity in regions of said stressing region annular face outside of said magnetic stressing region.

24. The dent removal head of claim 23 wherein said housing is formed of an encapsulating material.

25. The dent removal head of claim 24, wherein said first and second apertures are substantially diametrically opposed about the longitudinal centerline of said coil.

26. The dent removal head of claim 25, wherein at least one of said first and second apertures are terminated by a transverse circular opening extending through each of said adjacent conductive convoluted layers.

27. The dent removal head of claim 26, wherein said first aperture is a hole and said second aperture is a slot.

28. The dent removal head of claim 26, wherein said first and second apertures are slots.

29. The dent removal head of claim 24, wherein said first aperture is a hole and said second aperture is a slot.

30. The dent removal head of claim 24, wherein said first and second apertures are slots.

31. A dent removal head for an electromagnetic dent remover comprising:
an electromagnetic working coil comprising a strip of conductive material spirally wound lengthwise into a tubular coil, said conductive material strip shaped to form a first annular surface having a protrusion over a predetermined portion thereof, said conductive material strip further shaped to form a second annular surface having a recess in a predetermined region thereof, said recess positioned so as to control the cross-sectional area of the conductive material strip forming said protrusion of said first annular surface; and electrical insulation material interposed between adjacent convolutions of said electrical coil; and,
a non-conductive housing for supporting and maintaining said electromagnetic working coil in a predetermined position with respect to a working plane defined by said housing.

32. The dent removal head of claim 31, wherein said recess is a mirror image of said protrusion.

33. The dent removal head of claim 32, wherein said recess is shaped such that the cross-sectional area of the portion of said conductive material strip forming said protrusion is less than the cross-sectional area of the remaining portions of said conductive material strip.

34. The dent removal head of claim 33, wherein said recess is contoured to establish variations in the cross-sectional area of said coil in the region of said protrusion, said cross-sectional variations controlling the current density within the portion of each of said convolutions forming said protrusion.

35. The dent removal head of claim 34 wherein said housing is formed of an encapsulating material.

* * * * *

UNITED STATES PATENT OFFICE
CERTIFICATE OF CORRECTION

Patent No. 4,061,007                    Dated December 6, 1977

Inventor(s) Hansen et al

It is certified that error appears in the above-identified patent and that said Letters Patent are hereby corrected as shown below:

Column 1, line 47, delete "the" (first occurrence) and insert therefor —that—.
Column 4, line 13, delete "a" and insert therefor —an—.
Column 6, line 5, after "60) insert —of the electromagnetic working coil 51, illustrated in FIGURE 4a—.
Column 7, line 14, delete "increases" and insert there —increase—.
Column 7, line 23, delete "thisinvention" and insert therefor —this invention—.
Column 8, line 13, delete "exmaple" and insert therefor —example—.
Column 8, line 26, delete "encapulated" and insert therefor —encapsulated—.
Column 8, line 62, delete the comma (,) after "attention".
Column 9, line 7, delete "therefor" and insert therefor —therefore—.
Column 10, line 11, delete "place" and insert therefor —placed—.
Column 10, line 14, delete "place" and insert therefor —placed—.
Column 10, line 30, delete "a" and insert therefor —an—.
Column 10, line 51, delete "resonous" and insert therefor —resinous—.

Signed and Sealed this

Twenty-fifth Day of April 1978

[SEAL]

Attest:

RUTH C. MASON
Attesting Officer

LUTRELLE F. PARKER
Acting Commissioner of Patents and Trademarks